Sept. 16, 1958     E. M. MARWELL     2,852,232
HEAT EXCHANGER
Filed March 30, 1953
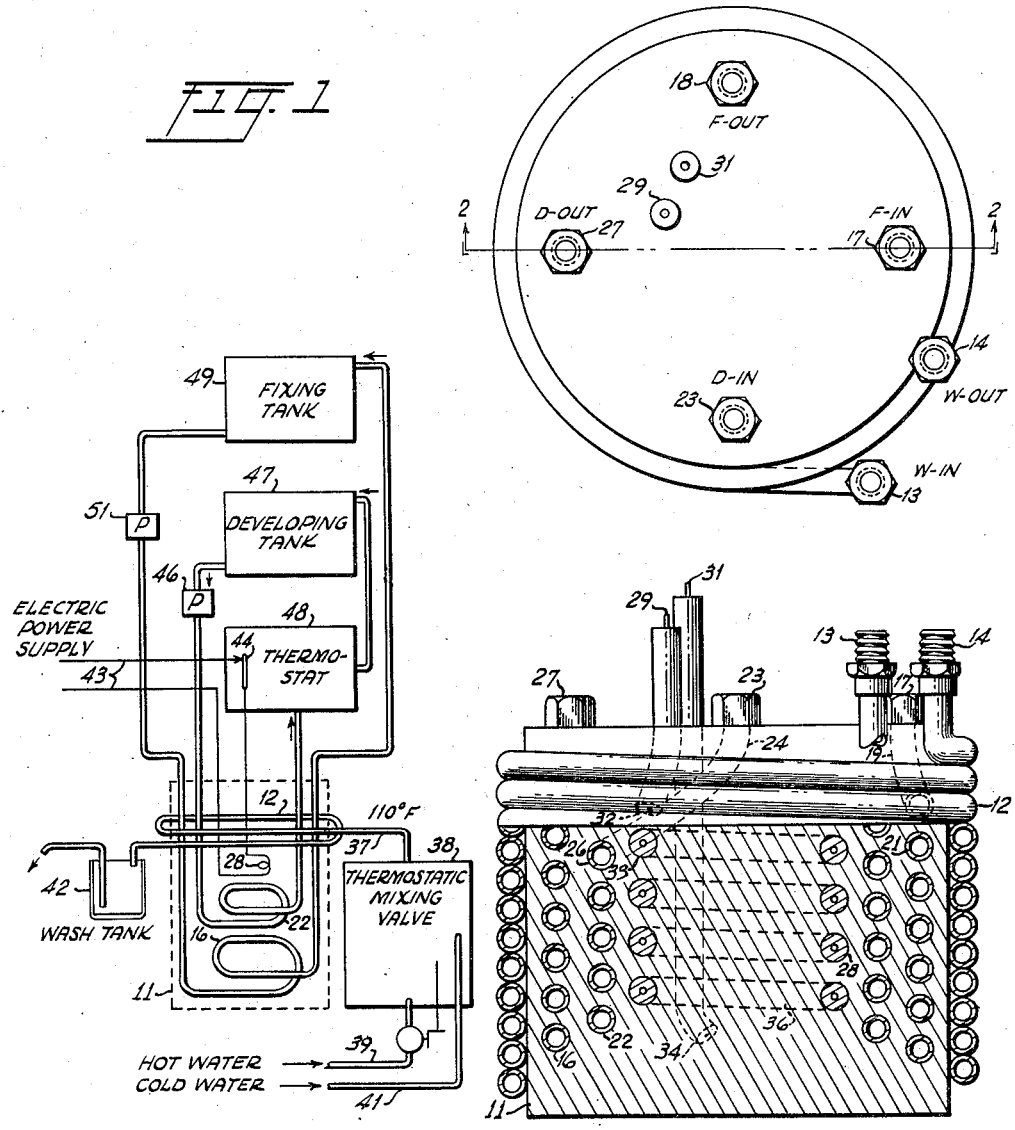
INVENTOR.
EDWARD M. MARWELL
BY
*H. A. Mackey*
ATTORNEY.

United States Patent Office 2,852,232
Patented Sept. 16, 1958

2,852,232

HEAT EXCHANGER

Edward M. Marwell, Mount Kisco, N. Y., assignor to General Precision Laboratory Incorporated, a corporation of New York Application March 30, 1953, Serial No. 345,377

4 Claims. (Cl. 257—4)

This invention relates to heat exchangers and more specifically to heat exchangers in which a fluid is subjected to both heat abstraction and heat addition for the purpose of preventing the temperature of the fluid from either rising above a selected range of temperatures or falling below it.

While this invention is of broad application in the art of heat exchangers, it is particularly directed toward the photographic art. In film development the maintenance of optimum temperatures of developing, fixing and wash liquids is of great importance. This is particularly true in motion picture film developers, and becomes imperative in rapid process developers in which the processing fluids must be maintained at precise temperatures with minimum variation.

In order to operate a developing machine in all climates it must be able to maintain its liquid temperatures through great extremes of ambient temperature, necessitating the inclusion in the heat exchanger of both a cooling and a heating element.

The instant invention provides such a heat exchanger having both a cooling element and a heating element. The cooling element comprises a pipe or tube system carrying a cooling liquid. The heating element may also employ a pipe or tube system carrying a fluid maintained at a temperature higher than that desired in the developer or other controlled processing fluid, or alternatively the heating element may consist of any other heat-introducing component such as an electrical heater. Heat may be transmitted between the heating element and the processing fluid, and between the cooling element and the processing fluid by any good heat conductor, and it has been found convenient to employ a metal conductor, those elemental metals sufficiently conductive for this purpose including copper, aluminum, and silver.

An important part of the design of this heat exchanger is the relative placement of the heating element, processing fluid duct, and cooling element. Generally speaking the heating and cooling elements are spaced so that a volume of conductive material exists between them through which heat energy is transferred from the hot element to the cold element, establishing a temperature gradient therein. The processing fluid duct is positioned within this volume intermediate the heating element and the cooling element, so that it may either or both lose heat to the cold element and gain heat from the hot element; or, if it is hotter than either, lose heat to both; or, if it is colder than either, grain heat from both. Principally, however, when heat capacities are properly proportioned, the positioning of the processing fluid duct in this region of temperature gradient permits precise temperature control of the processing fluid, and with the aid of appropriate thermostats secures such control, resulting in the maintenance of temperature within a small range intermediate the temperatures of the heating element and the cooling element.

The volume of heat conductive material connecting the heating and cooling elements preferably has high heat capacity, enabling the control of either or both of the heating and cooling elements on a time duty cycle without introducing undesirable temperature variations into the controlled fluid.

The principal purpose of this invention then is to provide a device including a heating element, a cooling element and a heat transmitting medium for maintaining the temperature of a fluid within a selected range of temperatures intermediate those of the heating and cooling elements.

Another purpose of this invention is to provide a heating element, processing fluid duct, and a cooling element, all three embedded in a metallic heat transmission medium and all three spatially arranged and separated in that order.

Still another purpose of this invention is to generate in a metallic medium a temperature gradient between a hot body and a cold body, and to provide therein a duct for processing fluid.

A further understanding of this invention may be secured from the detailed description and the drawings, in which:

Figure 1 is an end view of the heat exchanger of the invention.

Figure 2 is a side view, partly in section taken along line 2—2 of Fig. 1, of the heat exchanger.

Figure 3 is a circuit diagram of means for thermostatically controlling the temperatures of several processing liquids employed in developing photographic film.

Referring now to Figs. 1 and 2, a cylindrical block of aluminum 11 is surrounded by a helix, worm or coil of pipe 12. This coil terminates in two threaded male couplings 13 and 14, couplings 13 being a liquid inlet and coupling 14 constituting a liquid outlet. The coil 12 is preferably made of copper pipe, with all turns touching each other and soldered or welded together and where possible to the cylinder 11.

The cylinder 11 is preferably made by casting and contains embedded within itself three elements, preferably fabricated by the process of casting the cylinder 11 around them. The first element is a helical coil of pipe 16 embedded near the circumferential periphery of the cylinder 11, and having an inflow terminal or coupling 17 and an outlet coupling 18. This coil is deeply enough embedded in the aluminum cylinder to prevent bursting of the coil in the event of freezing of its contained liquid. The inlet coupling 17 is connected, as indicated by the dotted pipe 19, with the topmost turn 21 of the pipe coil, while the coupling 18 is connected to the bottommost turn of the pipe coil 16.

The second embedded element is a pipe coil 22 similar to coil 21 and similarly placed except that its radius is smaller. Its inlet coupling 23 is connected, as indicated by the dotted pipe 24, to the topmost turn 26 of the coil, and its outlet coupling 27 is connected to the bottommost turn. The direction of flow in this coil as well as in the first embedded coil is in reverse direction to the flow in the outer coil 16, thus utilizing the counterflow principle.

The third embedded element comprises an electrical resistance heating coil 28 constructed of an insulated resistance wire contained in a solid nickel alloy pipe, this construction being similar to that employed in the heating elements of electric ranges. This heating coil 28 has its two terminals 29 and 31 brought out through a plane end of the cast aluminum cylinder 11 and projecting therebeyond so that an electrical power connection can be made thereto. The terminal 29 is connected as indicated by the dotted portion 32 to the topmost turn 33 of the heating coil 28, while the terminal 31 is connected as indicated by the dotted portion 34 to the bottommost turn 36. The radius of this resistance coil 28 is made less than the radius of the pipe coil 22.

In operation, the pipe coil 12 is connected to a source of relatively cool water and constitutes the cooling element. The electric resistance coil 28 constitutes the heating element. The annular space between these two coils is the heat transfer space and in it, throughout the contained cast cylindrical material, a temperature gradient exists graded from the higher temperature of the heating element 28 to the lower temperature of the cooling element 12. The pipe coils 16 and 22 are entirely within this temperature gradient volume, so that heat addition or subtraction is applied to them in accordance with their temperatures and their positions in the temperature gradient space. These pipe coils 16 and 22 are used to conduct liquids which are to be maintained at selected temperatures.

For example, the heat exchanger may be employed in a photographic developing machine and the developing liquid may be circulated from the developing tank through the coupling 23, pipe coil 22, and output coupling 27 back to the developing tank. The fixing liquid may be circulated from the fixing tank through the coupling 17, pipe coil 16, coupling 18, and back to the fixing tank. The waste water from the cooling pipe coil 12 may be employed as wash water if the temperatures involved so permit.

As an example of temperature ranges, the temperature of water circulating in the cooling coil 12 may be held at 110° F. The liquids subjected to temperature control in the pipe coils 16 and 22 are held between that temperature and some higher temperature, say 120°, determined by the temperature of the heating element 28. In order to secure precise control a thermostat is applied to the developing liquid flowing out of coil 22 through coupling 27 and is controlled by the liquid temperature. This thermostat contains electrical contacts in the electrical power circuit of the heating coil 28, with such connections and adjustment that when the efflux temperature drops below 120° F. the electrical power is applied to the resistance coil 28, and when the efflux temperature rises above 120° F. the power is cut off.

A circuit and flow diagram for accomplishing this result is shown in Figure 3. The heat exchanger 11 has its cooling element coil 12 supplied with water at constant 110° F. temperature through pipe 37 and automatic thermostatic mixing valve 38, served by hot and cold water inflow pipes 39 and 41. The outflow passes through wash tank 42 to waste. The heat element 28 is connected to electrical supply lines 43 through a thermostatically controlled switch 44. The developer liquid is circulated by a pump 46 from the developing tank 47 through pipe coil 22, thermostat 48 and back to tank 47. The thermostat 48 is so set as to maintain, through control of the duty cycle of the heating element, the developer efflux temperature at 120° F. The fixing liquid is circulated from the fixing tank 49 by a pump 51 through pipe coil 16 and back to the fixing tank. Since the coil 16 is embedded closely adjacent thermostatically controlled coil 22, the temperature of the liquid in coil 16 is maintained nearly the same as that of the liquid in 22.

Obviously a great number of other combinations of heating and cooling elements, processing fluid pipe coils, and thermostatic controls may be employed to accomplish the same result. For example, the heating element may be kept heated constantly and the thermostatic control that is exercised by one of the processing fluid effluxes may be applied to the cooling element. Alternatively, both the heating and cooling element may be under the thermostatic control of the processing fluid. A single processing fluid pipe coil or a plurality of such coils may be employed, depending on the circumstances of use. In all cases, however, the processing fluid pipe coil or coils are disposed in the volume of the transmission medium between the heating element and the cooling element.

What is claimed is:

1. A heat exchanger comprising, a metallic body, a first element having a selected temperature level embedded therein, a second element having a fixed temperature level different from that of said first element surrounding said metallic body and in heat conductive contact therewith, a fluid duct embedded in said metallic body between said first and second elements, and thermostatic means operated in accordance with the temperature of a fluid in said fluid duct for controlling the temperature of at least one of said elements.

2. A heat exchanger comprising, a relatively massive metallic body, a heating element embedded therein centrally thereof, a fluid duct spaced from said heating element in intimate heat conductive contact with a substantial portion of said metallic body, means for producing a flow of constant temperature fluid in said duct, a second fluid duct embedded in said metallic body positioned between said heating element and said first mentioned duct, and thermostatic means operated in accordance with the temperature of a fluid in said second duct for controlling the temperature of said heating element.

3. A heat exchanger comprising, a relatively massive metallic body of good heat conductive material, a heating element embedded therein centrally thereof, a fluid duct comprising closely adjacent coils surrounding said body and in intimate heat conductive contact with the major portion of the peripheral surface thereof, means for producing a flow of fluid through said duct, means located at the input of said duct for maintaining said fluid at a substantially constant temperature lower than that of said heating element, a second fluid duct composed of a plurality of coils embedded in said body intermediate said heating element and the surface of said body, and thermostatic means operated in accordance with the temperature of a fluid in said second duct for controlling the temperature of said heating element.

4. A heat exchanger comprising, a massive metallic block having at least one helical duct cast internally thereof, an electrical heating element cast in said block and positioned internally of the convolutions of said helical duct, a second helical duct surrounding the major portion of the periphery of said block and having the adjacent convolutions thereof in intimate contact with each other and the surface of said block, means for supplying a fluid to said second duct, the temperature of which is maintained at a substantially constant level, whereby a fluid introduced into said first mentioned duct is brought to a temperature which is dependent only on the temperature gradient existing in said block between said heating element and said second duct and is independent of the temperature of the surrounding air.

References Cited in the file of this patent

UNITED STATES PATENTS

| | | |
|---|---|---|
| 1,958,791 | Kalbfleisch et al. | May 15, 1934 |
| 2,308,293 | Maude | Jan. 12, 1943 |
| 2,455,551 | Booth | Dec. 7, 1948 |
| 2,508,988 | Bradley | May 23, 1950 |
| 2,541,201 | Buecken et al. | Feb. 13, 1951 |
| 2,549,569 | Bradley | Apr. 17, 1951 |

FOREIGN PATENTS

| | | |
|---|---|---|
| 575,593 | Great Britain | Feb. 25, 1946 |